United States Patent
Kobayashi

(10) Patent No.: US 8,403,764 B2
(45) Date of Patent: Mar. 26, 2013

(54) CONSTANT VELOCITY UNIVERSAL JOINT

(75) Inventor: Masazumi Kobayashi, Iwata (JP)

(73) Assignee: NTN Corporation, Osaka (JP)

( * ) Notice: Subject to any disclaimer, the term of this patent is extended or adjusted under 35 U.S.C. 154(b) by 157 days.

(21) Appl. No.: 12/678,395

(22) PCT Filed: Sep. 24, 2008

(86) PCT No.: PCT/JP2008/067136
§ 371 (c)(1),
(2), (4) Date: Mar. 16, 2010

(87) PCT Pub. No.: WO2009/054216
PCT Pub. Date: Apr. 30, 2009

(65) Prior Publication Data
US 2010/0210368 A1 Aug. 19, 2010

(30) Foreign Application Priority Data
Oct. 24, 2007 (JP) ................................. 2007-276664

(51) Int. Cl.
*F16D 3/223* (2011.01)

(52) U.S. Cl. ........................................ 464/145; 464/906

(58) Field of Classification Search .................. 464/140, 464/145, 182, 906; 403/359.1, 359.6
See application file for complete search history.

(56) References Cited

U.S. PATENT DOCUMENTS

| 4,358,282 | A | 11/1982 | Yamamoto |
| 4,813,808 | A | 3/1989 | Gehrke |
| 5,954,587 | A | 9/1999 | Jacob et al. |
| 6,149,524 | A * | 11/2000 | Jacob ............................ 464/145 |
| 6,174,240 | B1 * | 1/2001 | Jacob et al. .................... 464/145 |
| 6,506,121 | B2 * | 1/2003 | Kobayashi et al. ........... 464/145 |
| 2002/0032064 | A1 | 3/2002 | Sone et al. |
| 2007/0037626 | A1 | 2/2007 | Yamazaki |

(Continued)

FOREIGN PATENT DOCUMENTS

| EP | 1 748 204 | 1/2007 |
| EP | 1 813 837 | 8/2007 |

(Continued)

OTHER PUBLICATIONS

Contact Mechanics. Cambridge, United Kingdom: Cambridge University Press, 1987. p. 268-269. TA350.J57.*

(Continued)

*Primary Examiner* — Gregory Binda
*Assistant Examiner* — Josh Skroupa
(74) *Attorney, Agent, or Firm* — Wenderoth, Lind & Ponack, L.L.P.

(57) ABSTRACT

A constant velocity universal joint includes an outer joint member having an inner surface with a plurality of track grooves, an inner joint member having an outer surface with a plurality of track grooves which are paired with the track grooves of the outer joint member, and an inner surface having a shaft hole with a spline, a plurality of balls interposed between the track grooves of the outer joint member and the track grooves of the inner joint member so as to transmit torque, and a cage interposed between the inner surface of the outer joint member and the outer surface of the inner joint member so as to retain the balls, in which the inner joint member includes an axial step portion between an inlet-side end surface thereof and a spline end portion of the shaft hole so as to form a recessed end surface.

11 Claims, 4 Drawing Sheets

U.S. PATENT DOCUMENTS

2007/0066407 A1* 3/2007 Sakaguchi et al. ............ 464/140
2008/0090665 A1 4/2008 Usui et al.

FOREIGN PATENT DOCUMENTS

| JP | 3188001 | | 7/1994 |
|----|---------|---|--------|
| JP | 08-189533 | | 7/1996 |
| JP | 08189533 | * | 7/1996 |
| JP | 9-177814 | | 7/1997 |
| JP | 2000-145805 | | 5/2000 |
| JP | 2002-013544 | | 1/2002 |
| JP | 2006-144814 | | 6/2006 |
| JP | 2007-064265 | | 3/2007 |
| JP | 2007064265 | * | 3/2007 |
| JP | 2007-170575 | | 7/2007 |
| WO | 2006/054614 | | 5/2006 |
| WO | 2007/072620 | | 6/2007 |
| WO | WO 2008010340 | * | 1/2008 |

OTHER PUBLICATIONS

Universal Joint and Driveshaft Design Manual. Warrendale, PA: Society of Automotive Engineers, 1979. p. 144-150. TJ1059.S62.*

International Preliminary Report on Patentability and Written Opinion of the International Search Authority mailed Jun. 10, 2010 in International (PCT) Application No. PCT/JP2008/067136.

International Search Report issued Nov. 25, 2008 in International (PCT) Application No. PCT/JP2008/067136.

Supplemental European Search Report issued Dec. 20, 2011 in corresponding European Application No. EP 08 84 2590.

* cited by examiner

CONSTANT VELOCITY UNIVERSAL JOINT

BACKGROUND OF THE INVENTION

I. Technical Field

The present invention relates to a constant velocity universal joint which is used, for example, in a power transmitting system of automobiles and various industrial machines and which solely allows operating-angle displacement between two shafts on a driving side and a driven side.

II. Description of the Related Art

A fixed type constant velocity universal joint is an example of a constant velocity universal joint used as means for transmitting torque from an engine of an automobile to wheels at constant velocity. The fixed type constant velocity universal joint connects two shafts on the driving side and the driven side and has a structure allowing constant-velocity transmission of rotational torque even when the two shafts form an operating angle. Generally, as in the fixed type constant velocity universal joint described above, a birfield type joint (BJ) and an undercut-free type joint (UJ) are widely known.

For example, the fixed type constant velocity universal joint of the BJ-type includes an outer joint member having a spherical inner surface in which a plurality of track grooves extending in an axial direction are formed equiangularly, an inner joint member having a spherical outer surface in which a plurality of track grooves extending in the axial direction while being paired with the track grooves of the outer joint member are formed equiangularly, a plurality of balls interposed between the track grooves of the outer joint member and the track grooves of the inner joint member so as to transmit torque, and a cage interposed between the spherical inner surface of the outer joint member and the spherical outer surface of the inner joint member so as to retain the balls.

The balls are arranged equiangularly while being accommodated in a plurality of pockets formed in the cage, respectively. In recent years, there is a fixed type constant velocity universal joint that includes eight balls as a fixed type constant velocity universal joint reduced in weight and size.

When the fixed type constant velocity universal joint is used, for example, for a drive shaft of an automobile, there is generally employed a structure in which the outer joint member is connected to a driven shaft, and a drive shaft extending from a plunging type constant velocity universal joint fixed to a differential on the vehicle body side is connected to the inner joint member through spline fit-engagement. In this constant velocity universal joint, when an operating angle is formed between the outer joint member and the inner joint member, each of the balls accommodated in the cage is always maintained within the bisector plane of the operating angle in any operating angle, thereby ensuring the constant velocity property of the joint.

In order to reduce size of the fixed type constant velocity universal joint, it is particularly important to ensure strength of the cage and strength of the inner joint member at the time of formation of a high operating angle.

The conventional constant velocity universal joint disclosed in JP 09-177814 A has a structure in which two kinds of pockets having different peripheral lengths are provided in a peripheral direction of the cage at equal intervals so that sectional areas of poles formed between the pockets and areas of inner and outer spherical surfaces of the cage are increased. In this manner, the strength of the cage is increased.

Further, in the constant velocity universal joint disclosed in JP 2002-13544 A, the shapes of corner round portions of pockets of the cage are regulated by dimension by setting ratio between a radius of curvature R of each corner round portion of the pockets and a diameter d of each ball to $R/d \geqq 0.22$. In this manner, the strength of the cage is increased.

Further, in the constant velocity universal joint disclosed in JP 3188001 B, the angle of an inlet-side chamfer positioned on a joint-inlet side in a spline hole of the inner joint member is regulated, to thereby increase the strength of the inner joint member.

SUMMARY OF THE INVENTION

Incidentally, for reducing weight and size of the fixed type constant velocity universal joints disclosed in JP 09-177814 A, JP 2002-13544 A and JP 3188001 B, it is necessary to reduce a thickness of a unit constructed of the outer joint member, the inner joint member, and the cage.

In particular, the inner joint member constructing the fixed type constant velocity universal joint has a structure in which a spline hole, into which a shaft is press-fitted, is formed at the center thereof. Therefore, when the thickness of the inner joint member is to be reduced, the thickness is extremely reduced at the bottom portion of each track groove 124 in an inlet-side end surface 123 of an inner joint member 120 into which the shaft is inserted (see a portion A of the conventional product illustrated in FIG. 2: a radial dimension $L_1$).

As a result, when the fixed type constant velocity universal joint forms the high operating angle, the above-mentioned bottom portion of each track groove 124 in the inlet-side end surface 123 of the inner joint member 120 receives stress from the ball positioned in the track groove 124. The bottom portion thus becomes the weakest portion, which leads to a risk that sufficient strength of the inner joint member 120 is difficult to be ensured.

The present invention has been made in view of the above-mentioned problem, and an object thereof is to provide a constant velocity universal joint capable of ensuring sufficient strength of the inner joint member even when the thickness of the inner joint member is reduced for reducing weight and size and even when the high operating angle is formed and high load torque is applied.

As a technical means for achieving the above-mentioned object, a constant velocity universal joint according to the present invention includes: an outer joint member having an inner surface in which a plurality of track grooves extending in an axial direction is formed; an inner joint member having an outer surface in which a plurality of track grooves extending in the axial direction is formed while being paired with the plurality of track grooves of the outer joint member, and an inner surface having a shaft hole in which a spline extending in the axial direction is formed; a plurality of balls interposed between the track grooves of the outer joint member and the track grooves of the inner joint member so as to transmit torque; and a cage interposed between the inner surface of the outer joint member and the outer surface of the inner joint member so as to retain the balls, in which the inner joint member includes an axial step portion provided between an inlet-side end surface of the inner joint member and a spline end portion of the shaft hole so as to form a recessed end surface positioned on a deeper side in comparison with the inlet-side end surface.

Here, the "inlet-side end surface of the inner joint member" means an end surface of the inner joint member which is positioned on an opening side of the outer joint member, that is, on a side from which a shaft member (shaft) to be press-fitted into the shaft hole of the inner joint member is inserted. Further, the "spline end portion of the shaft hole" means an end portion of the spline of the shaft hole which is positioned on the opening side of the outer joint member, that is, on the side from which the shaft member (shaft) to be press-fitted into the shaft hole of the inner joint member is inserted. Further, the "axial step portion" means a step formed by concaving the inlet-side end surface of the inner joint member in the axial direction.

According to the present invention, even when the thickness of the inner joint member is reduced for reducing weight and size of the constant velocity universal joint, it is possible to ensure sufficient strength of the inner joint member even at the time of formation of the high operating angle and application of the high load torque. This is because the provision of the axial step portion between the inlet-side end surface of the inner joint member and the spline end portion of the shaft hole and formation of the recessed end surface positioned on the deeper side in comparison with the inlet-side end surface can make the thickness of the recessed end surface, that is, the thickness in the bottom portions of the track grooves (see portion B of the present invention illustrated in FIG. 2: radial dimension $L_2$) larger than that of the conventional product (see portion A of the conventional product illustrated in FIG. 2: radial dimension $L_1$).

It is desirable that the recessed end surface in the present invention be formed in a part corresponding to the bottom portions of the track grooves. With this, when the constant velocity universal joint forms a high operating angle, a ball contact point does not protrude from the track groove. Therefore, the torque transmission is efficiently and reliably performed.

It is desirable that the radial dimension of the recessed end surface in the present invention be set to 1 mm or more. When the radial dimension of the recessed end surface is smaller than 1 mm, it is difficult to ensure sufficient strength of the inner joint member when the high operating angle is formed and the high load torque is applied.

Note that it is preferred that the radial dimension of the recessed end surface in the present invention be set to 1.5 mm or more, and an unhardened layer portion exist in the end portion of the inner joint member in which the recessed end surface is formed. When the radial dimension of the recessed end surface is thus set to 1.5 mm or more, the unhardened layer portion remains in the end portion of the inner joint member in which the recessed end surface is formed. Therefore, it is possible to stably ensure sufficient strength of the inner joint member at the time of formation of the high operating angle and application of the high load torque.

Note that it is desirable that the constant velocity universal joint according to the present invention includes five to eight balls. Further, it is desirable that the track grooves of the outer joint member and the track grooves of the inner joint member be formed by forging.

Further, the present invention is applicable to anyone of a fixed type constant velocity universal joint of a birfield type (BJ) including the outer joint member and the inner joint member each having track grooves having single-circular-arc-shaped longitudinal sections in the axial direction and a fixed type constant velocity universal joint of an undercut-free type (UJ) including the outer joint member and the inner joint member each having track grooves provided with straight portions parallel to the axial direction.

According to the present invention, even when the thickness of the inner joint member is reduced for reducing weight and size of the constant velocity universal joint, it is possible to ensure sufficient strength of the inner joint member even at the time of formation of the high operating angle and application of the high load torque. This is because the provision of the axial step portion between the inlet-side end surface of the inner joint member and the spline end portion of the shaft hole and formation of the recessed end surface positioned on the deeper side in comparison with the inlet-side end surface can make the thickness of the recessed end surface in the bottom portions of the track grooves larger than that of the conventional product.

As a result, it is possible to achieve a reduction in weight and size of the constant velocity universal joint simultaneously with an increase in strength of the inner joint member. Therefore, it is possible to provide a highly-reliable constant velocity universal joint having a long life.

DETAILED DESCRIPTION OF THE INVENTION

An embodiment of a constant velocity universal joint according to the present invention is described in detail. The embodiment illustrated in FIG. 1 exemplifies a fixed type constant velocity universal joint of a birfield type (BJ) including an outer joint member and an inner joint member each having track grooves whose longitudinal section in the axial direction exhibits a single-circular-arc-surface shape.

Note that, though not shown, this embodiment is also applicable to a fixed type constant velocity universal joint of an undercut-free type (UJ) including an outer joint member and an inner joint member each having track grooves provided with a straight portion parallel to the axial direction. Further, this embodiment is also applicable to a fixed type constant velocity universal joint of another type having track grooves whose shape is different from that of the birfield type and the undercut-free type.

Figure 1:
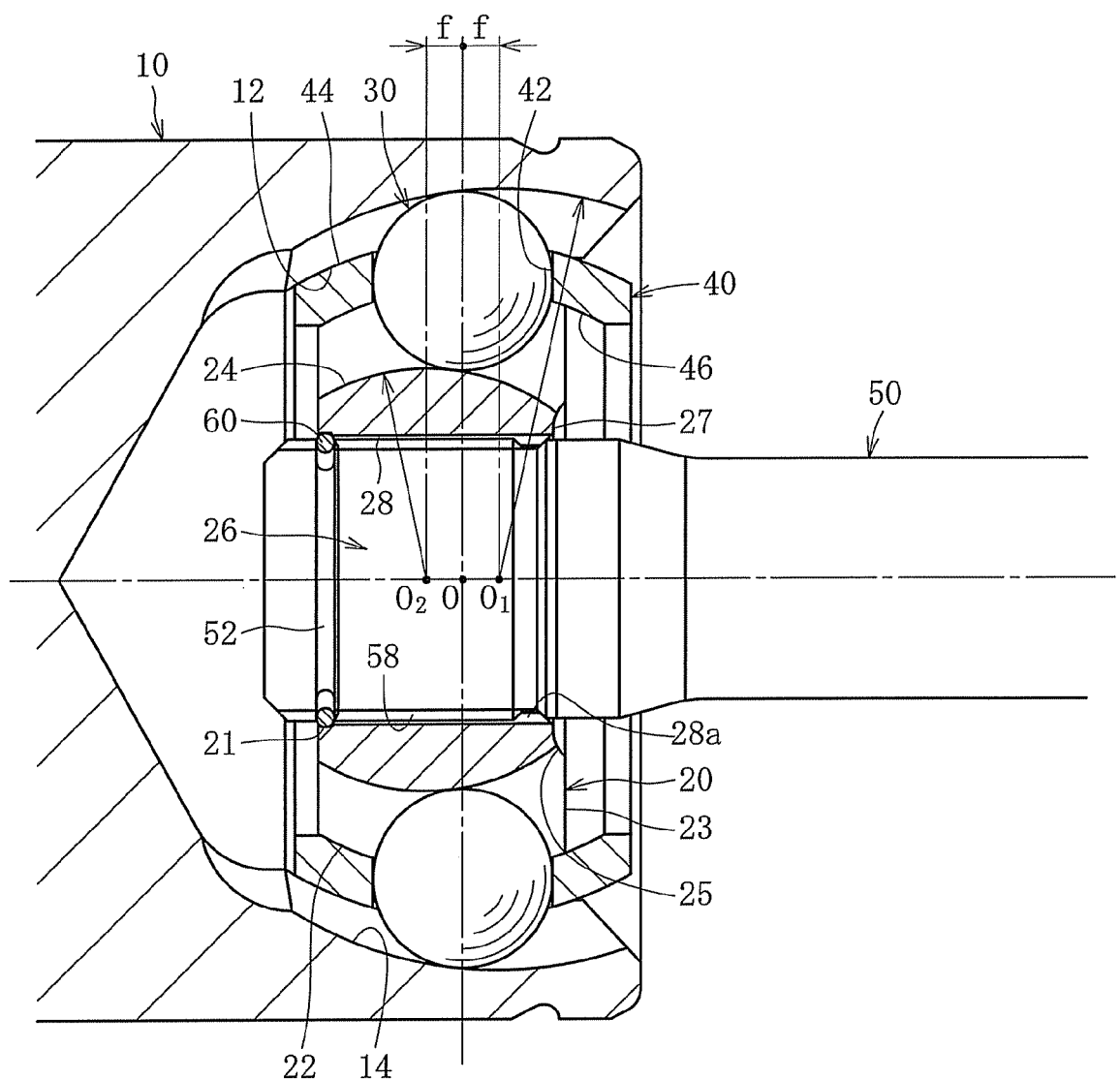
FIG. 1 is a longitudinal sectional view illustrating an entire structure of a birfield type constant velocity universal joint according to an embodiment of the present invention.

The fixed type constant velocity universal joint of the BJ-type illustrated in FIG. 1 includes an outer joint member 10, an inner joint member 20, a plurality of balls 30, and a cage 40. The outer joint member 10 has a spherical inner surface 12 in which a plurality of track grooves 14 extending in the axial direction are formed equiangularly. The inner joint member 20 has a spherical outer surface 22 in which a plurality of track grooves 24 extending in the axial direction, while being paired with the track grooves 14 of the outer joint member 10, are formed equiangularly. The balls 30 are respectively interposed between the track grooves 14 of the outer joint member 10 and the track grooves 24 of the inner joint member 20 to transmit torque. The cage 40 is interposed between the spherical inner surface 12 of the outer joint member 10 and the spherical outer surface 22 of the inner joint member 20 to retain the balls 30. Note that, the track grooves 14 of the outer joint member 10 and the track grooves 24 of the inner joint member 20 are formed by forging.

The inner joint member 20 has a shaft hole 26 formed therein, and a shaft 50 is inserted into the shaft hole 26 from an opening side of the outer joint member 10. Then, a spline 28 formed on the inner surface of the shaft hole 26 and a spline 58 formed on the outer surface of the shaft 50 are meshed with each other. As a result, the inner joint member 20 and the shaft 50 are connected to each other so as to allow torque transmission. The shaft 50 is prevented from being detached by engaging a snap ring 60 such as a circlip, which is fitted in an annular recessed groove 52 formed in an axial end portion thereof, and is caught in a recessed portion 21 formed in a deep side of an opening end portion of the inner joint member 20.

The balls 30 are arranged equiangularly while being accommodated in a plurality of pockets 42 formed in the cage 40, respectively. The number of the balls 30, in other words, the numbers of the track grooves 14 and 24 and the pockets 42 of the cage 40 are arbitrary. For example, the numbers may be five to eight. When eight balls 30 are provided, a more compact constant velocity universal joint can be realized in comparison with the constant velocity universal joint using six balls. Further, an internal component constructed of the inner joint member 20, the balls 30, and the cage 40 is accommodated in the interior of the outer joint member 10 so as to make relative movement.

The track grooves 14 and 24 of the BJ-type constant velocity universal joint have single-circular-arc-surface-shaped longitudinal sections in the axial direction. A center of curvature $O_1$ of the track grooves 14 of the outer joint member 10 and a center of curvature $O_2$ of the track grooves 24 of the inner joint member 20 are offset from each other in a direction opposite to the axial direction by an equal distance f with respect to a joint center O including a ball center (track offset). Note that a center of curvature of the spherical inner surface 12 of the outer joint member 10 (spherical outer surface 44 of the cage 40) and a center of curvature of the spherical outer surface 22 of the inner joint member 20 (spherical inner surface 46 of the cage 40) correspond to the above-mentioned joint center O. As described above, owing to the provision of the track offset, a pair of the track grooves 14 and 24 form a wedge-like ball track having radial intervals gradually becoming larger from the deep side of the outer joint member 10 toward the opening side.

Note that, the UJ-type constant velocity universal joint is different from the BJ-type constant velocity universal joint merely in that each of the outer joint member 10 and the inner joint member 20 has the track grooves having straight portions parallel to the axial direction. Other components of the UJ-type constant velocity universal joint are the same as those of the BJ-type constant velocity universal joint.

When the constant velocity universal joint is used, for example, for a drive shaft of an automobile, the outer joint member 10 is connected to a driven shaft, and a drive shaft (shaft 50) extending from a plunging type constant velocity universal joint fixed to a differential on the vehicle body side is connected to the inner joint member 20 through spline fit-engagement. In this constant velocity universal joint, when an operating angle is formed between the outer joint member 10 and the inner joint member 20, each of the balls 30 accommodated in the cage 40 is always maintained within the bisector plane of the operating angle in any operating angle, thereby ensuring the constant velocity property of the joint.

Figure 2:
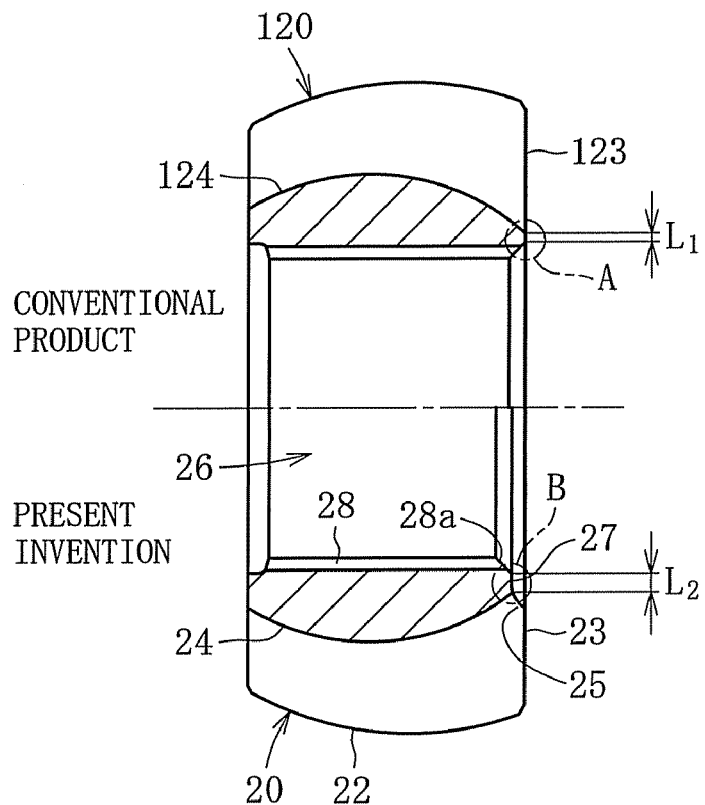
FIG. 2 is a longitudinal sectional view in which a lower half below the center line illustrates an inner joint member of the constant velocity universal joint of FIG. 1 and an upper half above the center line illustrates an inner joint member of a conventional constant velocity universal joint.

In order to reduce the size of the constant velocity universal joint, it is necessary, for example, to ensure strength of the inner joint member 20 when the high operating angle is formed. Here, FIG. 2 illustrates the inner joint member 20, 120 as one component constructing the constant velocity universal joint of FIG. 1. In the lower half below the center line of FIG. 2, the inner joint member 20 of the present invention is illustrated. In the upper half above the center line thereof, the inner joint member 120 as a conventional product is illustrated for comparison with the present invention.

In the constant velocity universal joint according to this embodiment, an axial step portion 25 is provided between an inlet-side end surface 23 of the inner joint member 20 and a spline end portion 28a of the shaft hole 26, and a recessed end surface 27 is formed on a deeper side in comparison with the inlet-side end surface 23. The inlet-side end surface 23 of the inner joint member 20 and the spline end portion 28a of the shaft hole 26 are positioned on a side from which the shaft 50 to be press-fitted into the shaft hole 26 of the inner joint member 20 is inserted, that is, on the opening side of the outer joint member 10.

As illustrated in FIG. 2, a reduction in thickness of the inner joint member 20, 120 for the purpose of reducing weight and size of the constant velocity universal joint leads to the following situations. In the case of conventional product, thickness is reduced in the bottom portion of each track groove 124 in the inlet-side end surface 123 of the inner joint member 120 (radial dimension $L_1$ of a portion A). In contrast, in the case of the present invention, due to provision of the axial step portion 25 between the inlet-side end surface 23 of the inner joint member 20 and the spline end portion 28a of the shaft hole 26 and formation of the recessed end surface 27 positioned on the deeper side in comparison with the inlet-side end surface 23, the thickness in the bottom portion of each track groove 24 in the recessed end surface 27 (radial dimension $L_2$ of a portion B) can be made larger than that of the conventional product (radial dimension $L_1$ of the portion A) ($L_2 > L_1$).

In this manner, the thickness in the recessed end surface 27 of the inner joint member 20 is increased in comparison with the conventional product. Therefore, even when the high operating angle is formed and the high load torque is applied, it is possible to ensure sufficient strength of the inner joint member 20. As a result, it is possible to reduce weight and size of the constant velocity universal joint and to increase strength of the inner joint member 20.

The radial dimension $L_2$ of the recessed end surface 27 positioned on the deeper side in comparison with the inlet-side end surface 23 of the inner joint member 20 is set to 1 mm or more. When the radial dimension $L_2$ of the recessed end surface 27 is smaller than 1 mm, stress is prone to concentrate on the recessed end surface 27 at the time of formation of the high operating angle and application of the high load torque. Therefore, it is difficult to ensure sufficient strength of the inner joint member 20.

Figure 3:
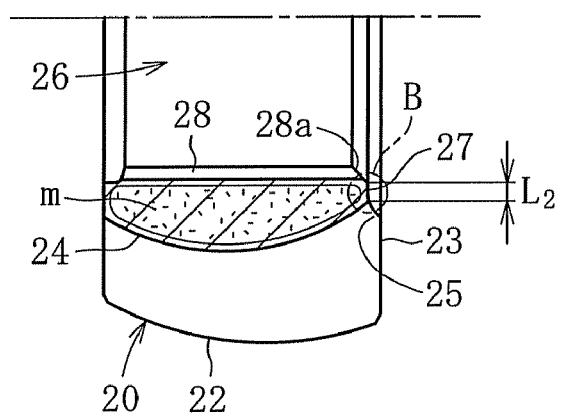
FIG. 3 is a partial sectional view illustrating a mode in which the inner joint member of the constant velocity universal joint of FIG. 1 includes an unhardened layer portion existing in an end portion of the inner joint member in which a recessed end surface is formed.

Note that, in order to ensure strength of the inner joint member 20, the outer surface and the end surface of the inner joint member 20 and the inner surface of the shaft hole 26 generally have surface-hardened layers (not shown) formed by heat treatment such as carburizing and quenching. As illustrated in FIG. 3, when the radial dimension $L_2$ of the recessed end surface 27 is set to 1.5 mm or more, an unhardened layer portion m remains in the inlet-side end portion of the inner joint member 20 in which the recessed end surface 27 is formed. As a result, it is possible to stably ensure sufficient strength of the inner joint member 20 when the high operating angle is formed and the high load torque is applied.

Figure 4:
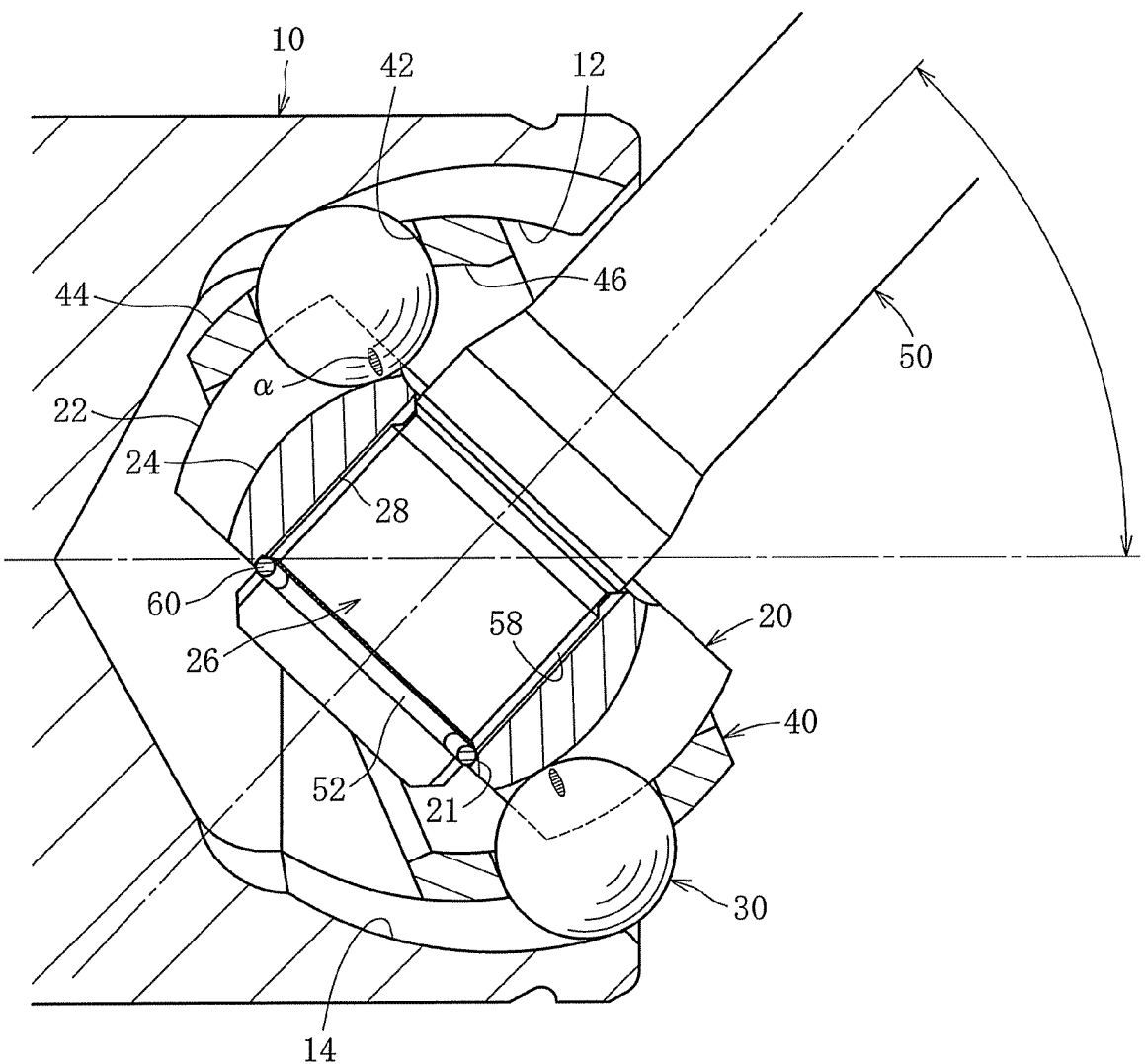
FIG. 4 is a longitudinal sectional view illustrating a state in which the constant velocity universal joint of FIG. 1 forms a high operating angle.

The recessed end surface 27 positioned on the deeper side in comparison with the inlet-side end surface 23 of the inner joint member 20 is formed in a part corresponding to the bottom portions of the track grooves 24. With this, as illustrated in FIG. 4, when the constant velocity universal joint forms a high operating angle, a ball contact point α, that is, an osculating ellipse by which the ball 30 comes into contact with the track groove 24 of the inner joint member 20 does not protrude from the track groove 24. Therefore, the torque transmission is efficiently and reliably performed. Note that the above-mentioned ball 30 means, as illustrated in FIG. 4, for example, the ball 30 of the eight balls, which is positioned on the deepest portion of the track groove 14 of the outer joint member 10 (portion nearest to the inlet of the track groove 24 of the inner joint member 20).

Figure 5:
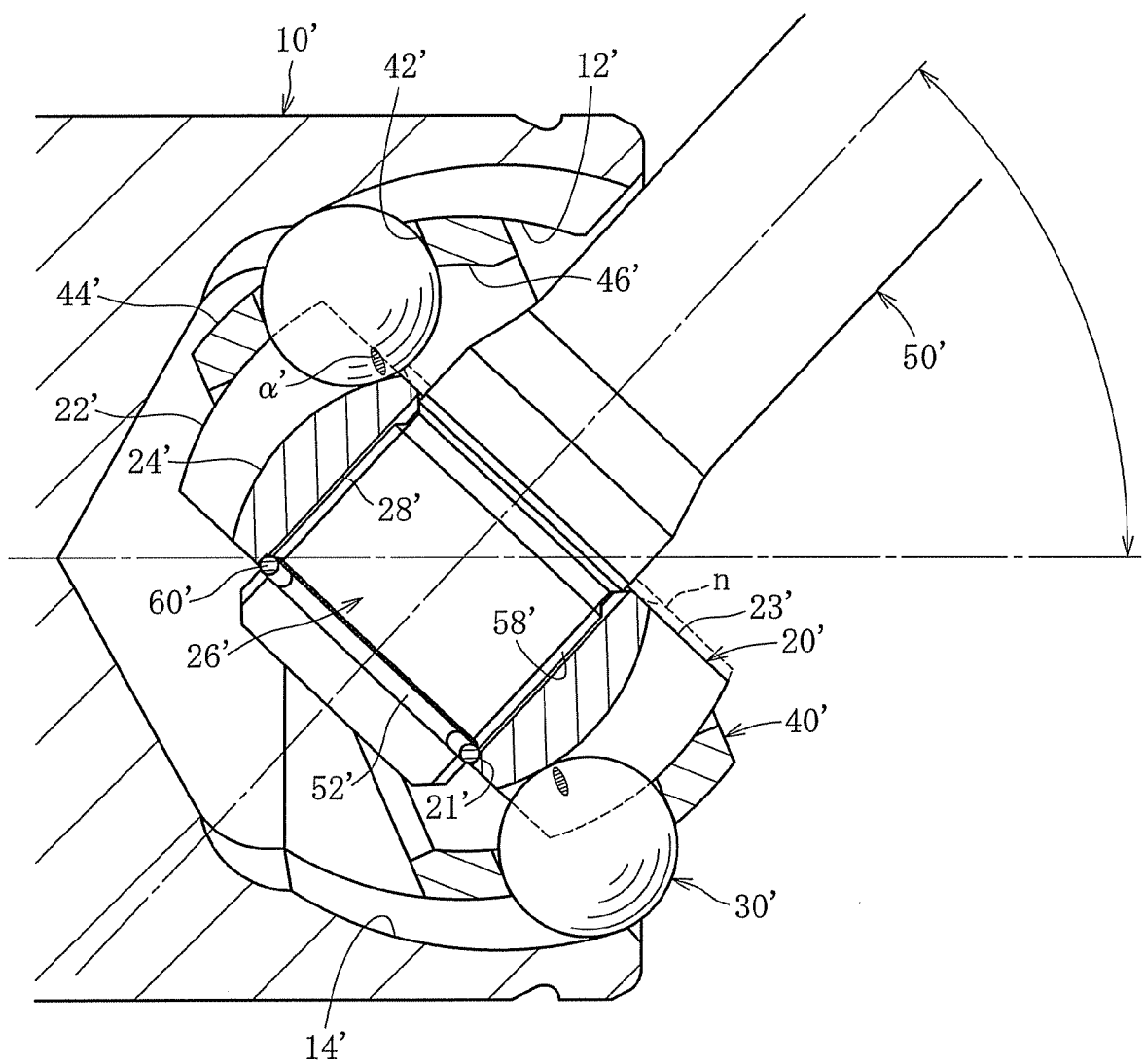
FIG. 5 is a longitudinal sectional view illustrating a state in which a constant velocity universal joint including an inner joint member whose axial width is simply reduced forms the high operating angle.

For comparison with this, FIG. 5 illustrates a comparative example with respect to the embodiment of FIG. 1. Note that, in FIG. 5, portions that are the same as those of FIG. 1 are denoted by the same reference numerals with a prime added thereto, and the redundant description is omitted. As illustrated in FIG. 5, when a portion positioned on a further outer diameter side in comparison with the recessed end surface formed in a part corresponding to the bottom portion of each track groove 24' (portion n indicated by a dotted line in the figure) is eliminated, that is, when the axial width of an inner joint member 20' is simply reduced, it is possible to ensure thickness in an inlet-side end surface 23' of the inner joint member 20'.

However, in this case, a portion extending upright from the bottom portion in the track groove 24' of the above-mentioned portion positioned on the further outer diameter side in comparison with the recessed end surface (portion indicated by the dotted line in the figure) is eliminated, and hence a ball contact point a' protrudes from the track groove 24' of the inner joint member 20'.

Therefore, as illustrated in FIG. 5, even when the thickness in the inlet-side end surface 23' of the inner joint member 20' is to be ensured by simply reducing the axial width of the inner joint member 20', torque transmission is not efficiently performed because the ball contact point a' protrudes from the track groove 24' of the inner joint member 20'. Therefore, it is difficult to make the constant velocity universal joint satisfactory in its function.

Therefore, as in the embodiment illustrated in FIGS. 1 and 4, it is effective to form, in a part corresponding to the bottom portion of the track groove 24, the recessed end surface 27 positioned on the deeper side in comparison with the inlet-side end surface 23 of the inner joint member 20.

The present invention is not limited to the above-mentioned embodiment. As a matter of course, the present invention may be made in further various modes without departing from the gist and scope of the present invention. The scope of the present invention is described in claims, and the meanings equivalent to those described in the claims and all the modifications thereof are included therein.

The invention claimed is:

1. A constant velocity universal joint, comprising:
   an outer joint member having an inner surface, said inner surface having a plurality of track grooves extending in an axial direction;
   an inner joint member having an outer surface having a plurality of track grooves extending in the axial direction, and being paired with said plurality of track grooves of said outer joint member, and
   an inner surface having a shaft hole, said shaft hole having a spline extending in the axial direction;
   a plurality of balls interposed between said track grooves of said outer joint member and said track grooves of said inner joint member so as to transmit torque; and
   a cage interposed between said inner surface of said outer joint member and said outer surface of said inner joint member so as to retain said balls,
   wherein said inner joint member comprises an axial step portion disposed between an inlet-side end surface of said inner joint member and a spline end portion of said shaft hole so as to form a recessed end surface positioned so as to be recessed relative to said inlet-side end surface;
   said recessed end surface is disposed between said spline end portion of said shaft hole and bottom portions of said track grooves of said inner joint member, such that said recessed end surface extends to said bottom portions of said track grooves;
   when said constant velocity universal joint forms an operating angle, a ball of said plurality of balls is arranged to contact a respective track groove of said track grooves of said inner joint member so as to form an osculating ellipse that does not protrude from said track grooves of said inner joint member;
   said inner joint member includes a portion extending upright from a bottom portion of said bottom portions of at least one track groove of said inner joint member, said portion extending upright being positioned on a further outer diameter side relative to said recessed end surface, and
   each of said track grooves of said outer joint member and said inner joint member extends in the axial direction and has a single circular-arc shape.

2. A constant velocity universal joint according to claim 1, wherein a radial dimension of said recessed end surface is 1 mm or more.

3. A constant velocity universal joint according to claim 2, wherein:
   the radial dimension of said recessed end surface is 1.5 mm or more, and said recessed end portion is disposed in an end surface of said inner joint member; and
   an unhardened layer portion is disposed in said end portion of said inner joint member.

4. A constant velocity universal joint according to claim 3, wherein said plurality of balls comprise five to eight balls.

5. A constant velocity universal joint according to claim 2, wherein said plurality of balls comprise five to eight balls.

6. A constant velocity universal joint according to claim 1, wherein:
   a radial dimension of said recessed end surface is 1.5 mm or more, and said recessed end surface is disposed in an end surface of said inner joint member; and
   an unhardened layer portion is disposed in said end portion of said inner joint member.

7. A constant velocity universal joint according to claim 6, wherein said plurality of balls comprise five to eight balls.

8. A constant velocity universal joint according to claim 1, wherein said plurality of balls comprise five to eight balls.

9. A constant velocity universal joint according to claim 1, wherein said track grooves of said outer joint member and said track grooves of said inner joint member are formed by forging.

10. A constant velocity universal joint according to claim 1, wherein said recessed end surface is disposed so as to correspond only to said bottom portions of said track grooves.

11. A constant velocity universal joint according to claim 1, wherein a pair of track grooves of said paired track grooves form a wedge shaped ball track having radial intervals that increase from a deep side of said outer joint member toward an opening side.

* * * * *